(12) United States Patent
Singh et al.

(10) Patent No.: US 12,152,704 B2
(45) Date of Patent: Nov. 26, 2024

(54) HOSE

(71) Applicant: Danfoss A/S, Nordborg (DK)

(72) Inventors: Dipak Singh, Maharashtra (IN);
Nivedita Singh, Pune (IN); Kubra Yilmaz, Cerkezköy-Tekirdağ (TR)

(73) Assignee: Danfoss A/S, Nordborg (DK)

( * ) Notice: Subject to any disclaimer, the term of this patent is extended or adjusted under 35 U.S.C. 154(b) by 227 days.

(21) Appl. No.: 17/639,155

(22) PCT Filed: Aug. 24, 2020

(86) PCT No.: PCT/EP2020/073625
§ 371 (c)(1),
(2) Date: Feb. 28, 2022

(87) PCT Pub. No.: WO2021/037793
PCT Pub. Date: Mar. 4, 2021

(65) Prior Publication Data
US 2022/0316628 A1 Oct. 6, 2022

(30) Foreign Application Priority Data

Aug. 28, 2019 (IN) .............................. 201911034696

(51) Int. Cl.
*F16L 11/08* (2006.01)
*B29D 23/00* (2006.01)
*F16L 57/06* (2006.01)
*B29K 23/00* (2006.01)
*B29K 305/00* (2006.01)

(52) U.S. Cl.
CPC .............. *F16L 11/08* (2013.01); *B29D 23/00* (2013.01); *F16L 11/081* (2013.01); *F16L 11/085* (2013.01); *F16L 57/06* (2013.01); *B29K 2023/0683* (2013.01); *B29K 2305/00* (2013.01)

(58) Field of Classification Search
CPC .......... F16L 11/04; F16L 11/08; F16L 11/085; F16L 57/06
USPC .................. 138/123–126, 137, 138, 140, 143
See application file for complete search history.

(56) References Cited

U.S. PATENT DOCUMENTS

| 3,881,521 A | | 5/1975 | Johansen et al. | |
| 4,204,707 A | * | 5/1980 | Lincicome | B60H 1/00571 |
| | | | | 138/139 |
| 5,052,444 A | * | 10/1991 | Messerly | F16L 11/088 |
| | | | | 138/132 |

(Continued)

FOREIGN PATENT DOCUMENTS

EP 2 395 271 A1 12/2011

OTHER PUBLICATIONS

International Search Report and Written Opinion of the International Searching Authority for International Patent Application No. PCT/EP2020/073625 mailed Nov. 9, 2020, 8 pages.

*Primary Examiner* — Patrick F Brinson
(74) *Attorney, Agent, or Firm* — Merchant & Gould P.C.

(57) ABSTRACT

Described is a hose and a method of manufacturing a hose. The hose comprises: an inner tube for communicating fluid; a reinforcement layer positioned over the inner tube; an intermediate cover positioned over the reinforcement layer, wherein the intermediate cover has a thickness of between 1.3 mm and 3.0 mm and comprises a material having a hardness of between 40 Shore A and 60 Shore A; and an outer cover comprising an abrasion resistant material.

12 Claims, 6 Drawing Sheets

(56) References Cited

U.S. PATENT DOCUMENTS

| | | | | |
|---|---|---|---|---|
| 5,316,046 A | * | 5/1994 | Igarashi | F16L 11/086 |
| | | | | 138/136 |
| 6,170,532 B1 | * | 1/2001 | Campbell | F16L 11/12 |
| | | | | 138/137 |
| 6,474,366 B2 | * | 11/2002 | Bruno | F16L 11/086 |
| | | | | 138/135 |
| 8,479,777 B2 | * | 7/2013 | Weil | F16L 11/083 |
| | | | | 428/36.9 |
| 10,066,766 B1 | | 9/2018 | Rong et al. | |
| 2005/0059764 A1 | | 3/2005 | Beck | |
| 2009/0211660 A1 | * | 8/2009 | Johnson | F16L 11/12 |
| | | | | 138/146 |
| 2011/0048566 A1 | * | 3/2011 | Theis | F16L 11/086 |
| | | | | 138/124 |
| 2011/0303318 A1 | * | 12/2011 | Nicolas | B32B 27/308 |
| | | | | 138/137 |
| 2015/0252918 A1 | | 9/2015 | Garver et al. | |
| 2018/0313489 A1 | * | 11/2018 | D'hondt | B32B 1/08 |

\* cited by examiner

HOSE

This application is a National Stage Application of PCT/EP2020/073625, filed 24 Aug. 2020, which claims benefit of Serial No. 201911034696, filed 28 Aug. 2019 in India, and which applications are incorporated herein by reference. To the extent appropriate, a claim of priority is made to each of the above-disclosed applications.

TECHNICAL FIELD

The present invention relates to hoses, more specifically, hoses having an outer cover which protects the hoses against damage due to abrasion.

BACKGROUND

Hoses are used to communicate fluid from one point to another. For example, hoses are used in hydraulic systems to communicate hydraulic fluid. Hoses can have different layers arranged over an inner tube through which the fluid passes. For example, a hose may have a reinforcement layer over the inner tube to improve the strength of the hose. Improving the strength of the hose using a reinforcement layer may allow that hose to communicate fluid at higher fluid pressure than otherwise. Hoses may be provided with a cover, e.g. a rubber cover over the reinforcement layer.

Some hoses are designed to be used in abrasive environments. For example, some hoses may be used in an environment in which there is friction between the hose and other e.g. components of a machine, etc. Such hoses may be provided with an outer cover comprising an abrasion resistant material.

Hoses may fail or become damaged over time through use as they are used to communicate fluid under pressure.

SUMMARY

Aspects of the present invention are listed in the accompanying claims.

Features of the present invention will now be described, by way of example only, with reference to the accompanying drawings, of which:

LIST OF FIGURES

Throughout, like reference signs denote like features.

DESCRIPTION

Figure 1:
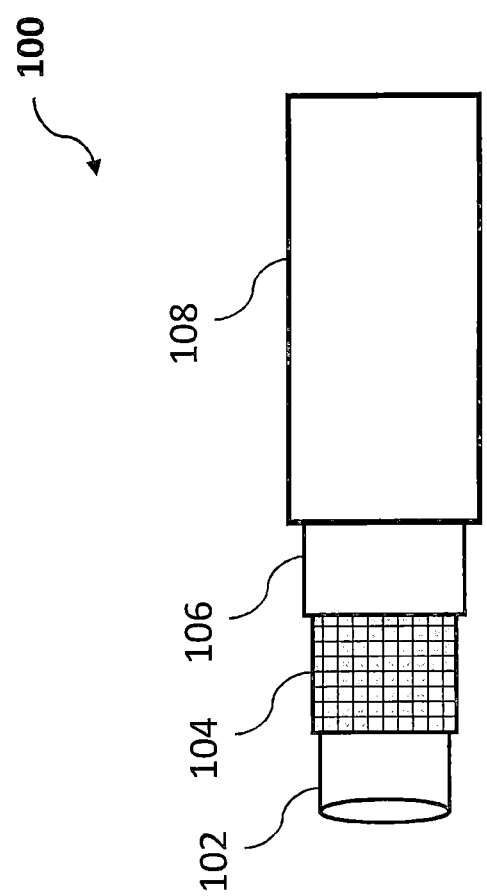
FIG. 1 illustrates schematically a side view of a hose, according to a first example.

FIG. 1 is a schematic side view of a first example of a first hose 100 (hereafter referred to as the "first hose 100"). The first hose 100 comprises an inner tube 102. The inner tube 102 is for communicating fluid. For example, the first hose 100 may be a hydraulic hose and the inner tube 102 may be for communicating hydraulic fluid. In other examples, the first hose 100 may be for communicating other kinds of fluid. The inner tube 102 may be composed of a material which can deform in reaction to a stress and strain being applied to it. For example, the inner tube 102 may be composed of a flexible material such as rubber. In some examples, the inner tube 102 comprises natural rubber. In other examples, the inner tube 102 may comprise synthetic rubber or thermoplastic.

Figure 2:
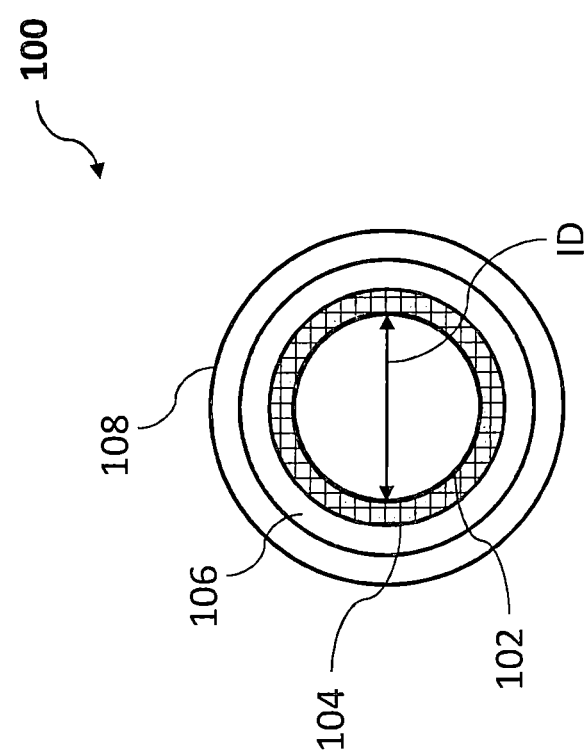
FIG. 2 illustrates schematically a cross-sectional view of the hose according to the first example.

FIG. 2 is a schematic cross-sectional view of the first hose 100. In the example of FIG. 2, the inner tube 102 has an internal diameter indicated by the two-way arrow labelled "ID" (for inner diameter). In some examples, the inner diameter ID of the inner tube 102 is between 6.35 mm and 25.4 mm. It should be noted that the internal diameter of a hose relates to a dash size of the hose. A dash size of "−4" corresponds to an internal diameter ID of ¼ inches or 6.35 mm, and a dash size of "−16" corresponds to an internal diameter ID of 1 inch or 25.4 mm. Each step in dash size corresponds to 1/16 of an inch. Accordingly, in some examples, the first hose 100 may have a dash size between "−4" and "−16". In other examples, the first hose 100 may have a different dash size.

In some examples, the inside diameter of the inner tube 102 of the first hose 100 is between 6.35 mm and 25.4 mm. In other words, in some examples, the first hose 100 may have a dash size between "−4" and "−16".

In this example, the first hose 100 comprises a first reinforcement layer 104 positioned over the inner tube 102. The first reinforcement layer 104 is provided to improve the structural strength of the first hose 100 such that the first hose 100 can support fluid moving through the inner tube 102 at relatively high pressure 100 bar to 420 bar. For example, the first hose 100 may be intended for communicating fluids at or above a given fluid pressure which cannot be supported by a non-reinforced inner tube 102. For example, the inner tube 102 may become deformed or damaged when fluid passes through it at or above the given fluid pressure. The function of the first reinforcement layer 104 is to improve the structural strength of the first hose 100 by providing support to the inner tube 102 such that fluid can be communicated through the inner tube 102 at or above the given fluid pressure without causing deformation of, or damage to the inner tube 102 or other components of the first hose 100.

In some examples, the first reinforcement layer 104 comprises metal wire. In other examples, the first reinforcement layer 104 may comprise a textile. In some examples, the first reinforcement layer 104 comprises a spiral reinforcement structure. For example, the metal wire or textile may be formed into a spiral structure so the first reinforcement layer 104 has a spiral structure. In some examples, the first reinforcement layer 104 comprises a braided reinforcement structure. For example, the metal wire or textile may be formed into a braid to provide the first reinforcement layer 104 with a braided structure. The material used and the type of structure used of the first reinforcement layer 104 depends on the intended application of the first hose 100, and may vary among different examples.

In the example of FIG. 1 and FIG. 2, the first hose 100 comprises an intermediate cover 106 positioned over the first reinforcement layer 104. The intermediate cover 106 has a thickness of between 1.3 mm and 3.0 mm and comprises a material having a hardness of between 40 Shore A and 60 Shore A. In some examples, the intermediate cover 106 comprises rubber. For example, the intermediate cover 106 may comprise natural or synthetic rubber. The advantage of the described thickness and hardness of the intermediate cover 106 is described in further detail below.

In the example of FIG. 1 and FIG. 2, the first hose 100 also comprises an outer cover 108. The outer cover 108 comprises an abrasion resistance material. One way in which a hose, such as the first hose 100 may fail is due to damage caused by the pressure of the fluid being communicated inside the hose in question. Another way in which a hose may fail is due to external damage. In this example, the outer cover 108 is provided for the purpose of protecting the first hose 100 from external damage that may be caused due to abrasion. For example, the first hose 100 may be intended for use in machinery in which the first hose 100 is expected to move relative to, and rub against other components of the machinery. For such applications, hoses which do not have an outer cover comprising an abrasion resistant material, such as the outer cover 108, may become damaged sooner than the first hose 100, due to abrasion. In some examples, the outer cover 108 comprises ultra-high molecular weight polyethylene (UHMWPE).

During use and during testing, a hose, such as the first hose 100, may be subjected to pressure impulses of the fluid being communicated through that hose. A pressure impulse is a variation in the fluid pressure inside the hose in question, discussed in further detail below. Pressure impulses may be applied periodically. As discussed above, internal damage to a hose may occur due to the pressure of the fluid being communicated. More specifically, variations in pressure may cause relative movement, expansion, contraction, bending, and the like, of various layers comprised in the hose in question and may cause damage/failure with time.

Figure 3:
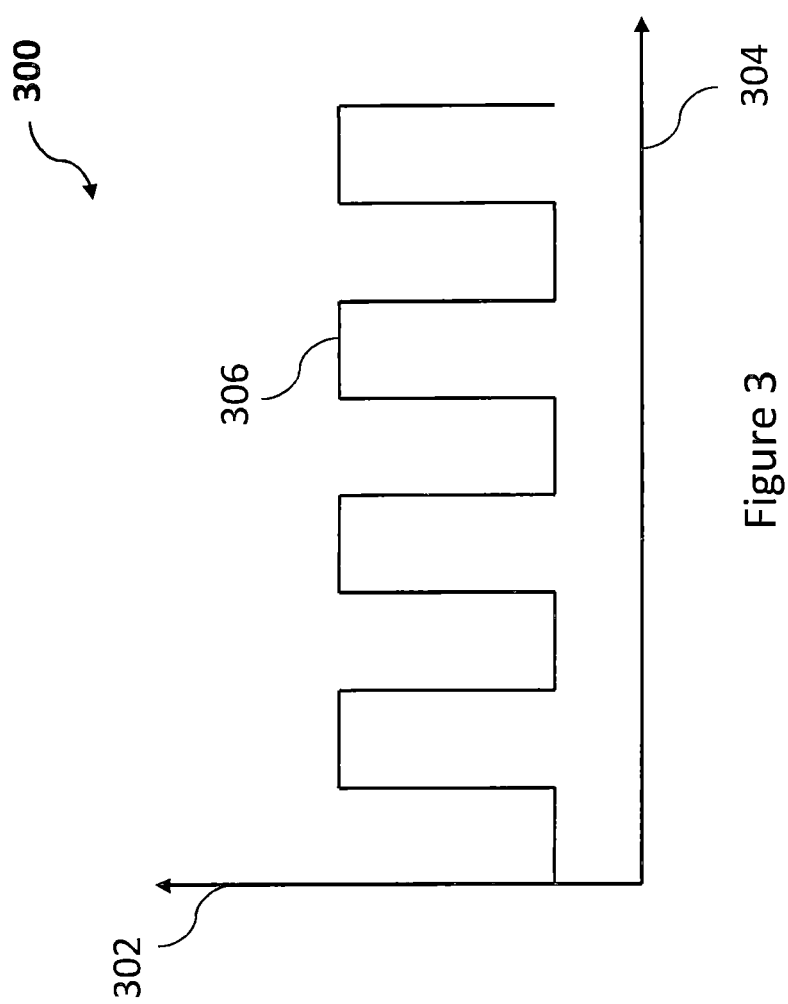
FIG. 3 is a sketch of a graph of fluid pressure with respect to time, according to an example.

The lifetime of a given hose may be quantified by performing a procedure in which that given hose is subjected to pressure impulses. For example, fluid may be passed through the given hose in pressure impulses. A pressure impulse may be defined as a cycle of increase and subsequent decrease in the fluid pressure through the given hose. In some examples, square wave pressure impulses may be used. FIG. 3 is a sketch of a graph 300 illustrating square wave impulses in the pressure of the fluid being passed through the given hose. The vertical axis 302 of the graph 300 represents pressure of the fluid in the given hose being tested, and the horizontal axis of the graph 300 represents time. The trace 306 represents the fluid pressure in the given hose with respect to time. As illustrated, the fluid pressure is periodically increased to a particular level and then decreased again, thereby defining a pressure impulse.

The lifetime of the given hose may be quantified by determining a number of e.g. average impulse cycles the given hose can withstand before failure or damage to the given hose occurs (the average may be established by performing the described testing procedure on a number of embodiments of the given hose). The number of pressure impulses a hose can sustain before failure may be referred to as the impulse life of that hose. A higher impulse life may indicate a higher life when the hose in question is being used in a practical scenario.

Figure 4:
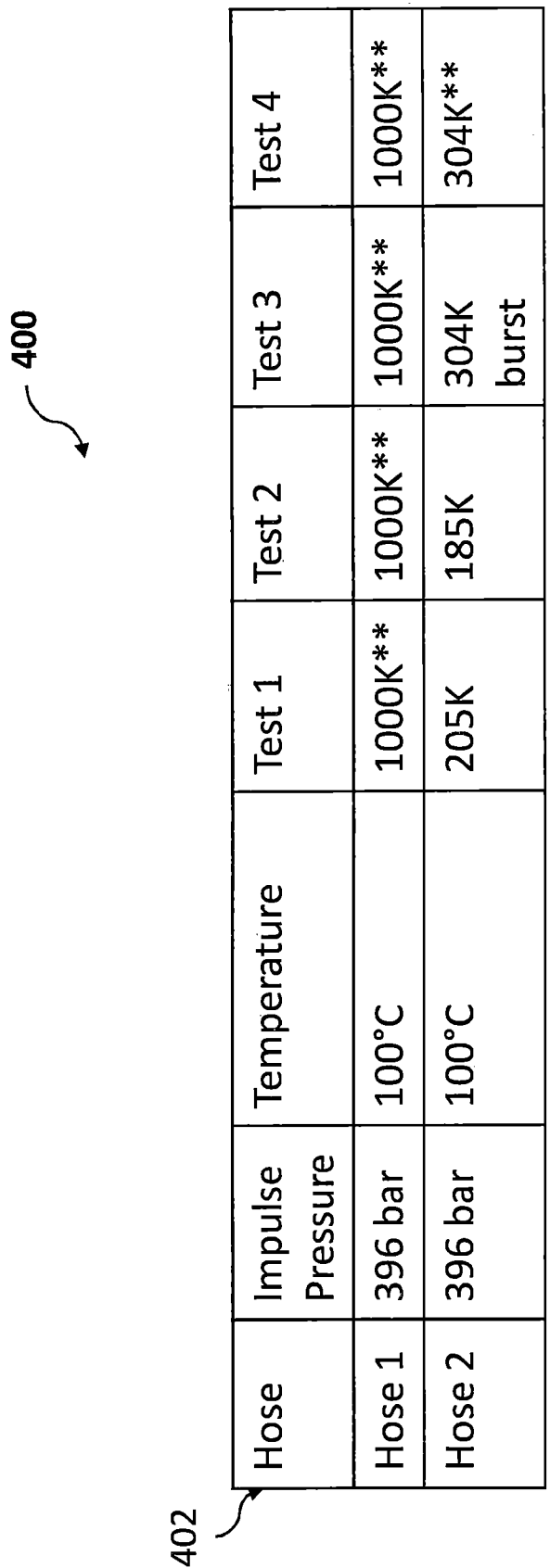
FIG. 4 shows a first table indicated data related to tests performed on a first plurality of hoses.

The inventors have observed that a hose having an abrasion resistance outer cover, such as the outer cover 108, may fail or become damaged sooner than another hose which is only different in that it does not comprise an abrasion resistance outer cover. FIG. 4 shows a first table 400 illustrating results of experiments carried out by the inventors on two different hoses. Hose 1 has a dash size of "-12" (i.e. the inner diameter of the inner tube is 19.0 mm). Hose 1 comprises an intermediate cover having a thickness of 1.0 mm and comprising a material having a hardness of between 67 Shore A. Hose 1 does not comprise an abrasion resistant outer cover. Hose 2 has a dash size of "-12". Hose 2 comprises an intermediate cover having a thickness of between 0.8 mm and 1.2 mm and comprising a material having a hardness of between -65 Shore A and 80 Shore A. Hose 2 comprises an abrasion resistant outer cover like the outer cover 108. Both Hose 1 and Hose 2 comprise two reinforcement layers.

The terms in the first row 402 indicate the information indicated by the respective columns. Data from four different iterations of the test procedure are shown in the final-four columns. The numbers shown in these columns show the number of pressure impulses the respective hose was subjected to. Some of the numbers in these columns terminate with a "K" which represents a thousand. A number in these four columns followed by "" represents that that number of pressure impulses were performed without failure occurring. A number not followed by "" indicates that the respective hose did fail at that number of pressure impulses being performed. The presence of the term "burst" indicates that the respective hose for the respective test burst after the number of pressure impulses indicated.

The results shown in first table 400 demonstrate that in general the presence of an abrasion resistant outer cover reduces the impulse life of a hose. Although the hoses to which the results in the first table 400 relate are hoses comprising two reinforcement layers, the same can be expected for hoses with a single reinforcement layer such as the first hose 100.

The life limiting effect of the rigid outer cover 108 may be understood as follows. Considering the example of FIG. 1 and FIG. 2, when fluid is passed through the first hose 100 under pressure, the various layers of the first hose 100 may experience relative movement with respect to each other, expansion, contraction, and the like, based on the variations in pressure of the fluid passing through the first hose 100. For simplicity, relative movement, expansion, contraction, bending, etc., is referred to simply as movement in the below description. While the outer cover 108 protects the first hose 100 against damage from abrasion, it may also restrict the movement of the layers of the first hose 100 which it covers. This is because the outer cover 108 may be more rigid than the other layers of the first hose 100 which it covers. For example, the outer cover 108 may restrict the movement of the intermediate cover 106 and the first reinforcement layer 104.

The movement of the first reinforcement layer 104 and the intermediate cover 106 being restricted when fluid flows through the inner tube 102 may cause, for example, the first reinforcement layer 104 to experience greater stress and strain compared to when the first reinforcement layer 104 and the intermediate cover 106 are less restricted. Inhibition of movement may result in poor transfer of stress and strain between the layers of the hose. For example, when movement of the first reinforcement layer 104 and the intermediate cover 106 is relatively restricted, less stress and strain may be transferred to the intermediate cover 106 from the first reinforcement layer 104 compared to a case in which movement of the first reinforcement layer 104 and the intermediate cover 106 is less restricted. For example, the outer cover 108 being rigid may cause the intermediate cover 106 to also be rigid, and the first reinforcement layer 104 may be pressed between the intermediate cover 106 and the inner tube 102 when fluid is passed through the first hose 100 under pressure.

As a result of use, the first reinforcement layer 104 may become damaged, or may otherwise fail with time. The arrangement of the first hose 100 described herein is intended to increase the lifetime of the first hose 100 compared to prior art hoses by allowing greater movement (e.g. greater relative movement, expansion, contraction, bending, etc.) of the layers of the first hose 100 despite the presence of an abrasion resistant outer cover. Restricting the layers of the first hose 100 less, and thereby allowing greater movement may allow stress and strain to be more distributed among the different layers of the first hose 100. Distributing the stress and strain more among the different layers of the first hose 100 increases the life of the first hose 100 because no single layer experiences a relatively large force, causing it to fail or become damaged at an earlier time.

The first hose 100 achieves an improved lifetime despite the presence of the outer cover 108 as a result of the intermediate cover having a thickness of between 1.3 mm and 3.0 mm and comprising a material having a hardness of between 40 Shore A and 60 Shore A. The intermediate cover 106 is therefore thicker and softer than conventional intermediate covers in conventional abrasion resistant hoses. The intermediate cover 106 has a combination of thickness and hardness which allows greater movement of the first reinforcement layer 104. For example, the intermediate cover 106 may deform when fluid pressure causes the inner tube 102 to push the first reinforcement layer 104 against the intermediate cover 106. As a result, stress and strain may be transferred away from the first reinforcement layer 104 and to the intermediate cover 106, for example.

The advantage of improved lifetime when the intermediate cover 106 of thickness between 1.3 mm and 3.0 mm and comprising a material having a hardness of between 40 Shore A and 60 Shore A is used may be particularly apparent for hoses which have a dash size between "−4" and "−16". In some examples, the intermediate cover 106 has a thickness of between 1.5 mm and 1.7 mm. In some examples, the thickness of the intermediate cover 106 is 1.6 mm.

A hose according to the present inventive concept may comprise a plurality of reinforcement layers positioned over the inner tube 102. Each neighbouring pair of the plurality of reinforcement layers may have sandwiched therebetween an intermediate layer. The intermediate cover 106 may positioned over the plurality of reinforcement layers.

Figure 5:
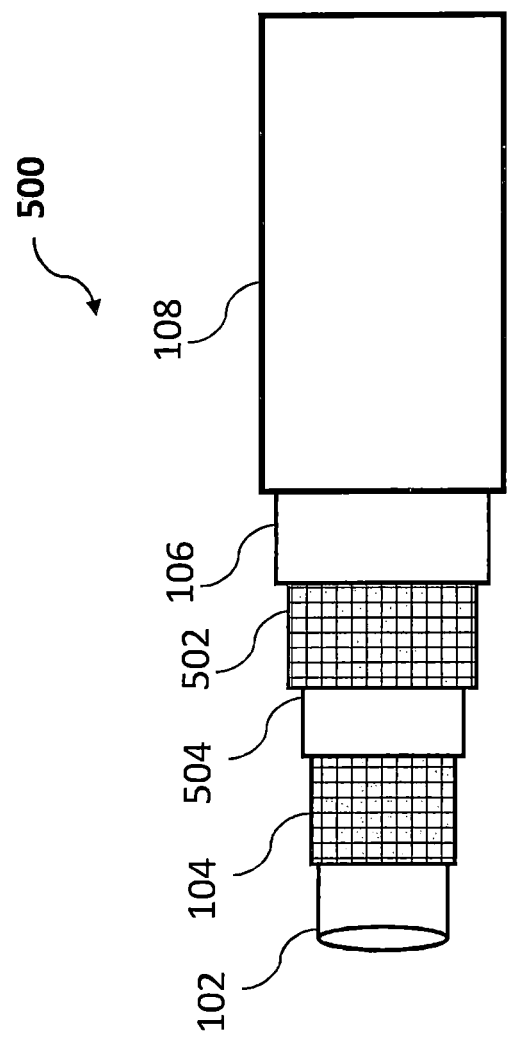
FIG. 5 illustrates schematically a side view of a hose, according to a second example.

FIG. 5 is a schematic side view of a second example of a hose 500 (hereafter referred to as "the second hose 500"). The second hose 500 comprises all the features described with respect to the first hose 100 and differs from the first hose 100 of FIG. 1 and FIG. 2 in that the second hose 500 comprises a plurality of reinforcement layers as described above. In this example, the second hose 500 comprises two reinforcement layers, namely the first reinforcement layer 104 and a second reinforcement layer 502. Sandwiched between the first reinforcement layer 104 and the second reinforcement layer 502 is an intermediate layer 504. The second hose 500 may be suitable for use in applications which require a more reinforced hose than the first hose 100 comprising only one reinforcement layer, for example.

The first and second reinforcement layers 104, 502 may comprise any of the above-described materials (e.g. metal wire or textile) formed into any of the above-described reinforcement structures (e.g. spiral reinforcement structure or braided reinforcement structure). The first and second reinforcement layers 104, 502 may comprise the same material or different respective materials. Further, the first and second reinforcement layers 104, 502 may comprise the same reinforcement structure or different respective reinforcement structures.

In some examples comprising a plurality of reinforcement layers, the intermediate layers sandwiched between neighbouring pairs of the plurality of reinforcement layers comprise rubber. For example, the intermediate layers may comprise natural or synthetic rubber.

A hose with a plurality of reinforcement layers and an abrasion resistance outer cover may suffer from a shorter lifetime due the presence of the abrasion resistant outer cover, as in the case of a hose with a single reinforcement layer discussed above. This is demonstrated in the data shown in Table 4. For example, in a conventional arrangement having a conventional intermediate cover, the presence of an abrasion resistant outer cover may restrict the movement of the intermediate cover 106 and the second reinforcement layer 502 because the abrasion resistant outer cover 108 is more rigid than the other layers. When fluid is communicated through the inner tube 102 under pressure, movement (e.g. relative movement, expansion, contraction, bending, etc.) of the first reinforcement layer 104 may occur. However, due to the restriction in the movement of the intermediate cover 108 and the second reinforcement layer 502 (which are closer in position to the rigid outer cover), less stress and strain may be transferred away from the first reinforcement layer 104 and into the second reinforcement layer 502 as compared to when the second reinforcement layer 502 and the intermediate cover 106 are not as restricted (the stress and strain may be less distributed among the different layers). Therefore, in such cases, the first reinforcement layer 104 may experience a relatively large stress and strain due to fluid pressure in the inner tube 102. As a result, the first reinforcement layer 104 may fail or become damaged with time as a result of use sooner than the case in which there is no abrasion resistant outer cover.

However, according to the present inventive concept, the second hose 500 comprises the intermediate cover 106 having a thickness of between 1.3 mm and 3.0 mm and comprises a material having a hardness of between 40 Shore A and 60 Shore A, as in the case of the first hose 100. Such an intermediate cover advantageously extends the life of the second hose 500 as compared to a hose which has a conventional intermediate cover but is otherwise the same.

The increase in the life of the second hose 500 is achieved because the thickness and hardness combination of the intermediate cover 106 allows greater movement of the second reinforcement layer 502 despite the presence of the outer cover 108. For example, when fluid passes through the inner tube 102 under pressure, the first reinforcement layer 104 may move depending on the variation in the fluid pressure. The stress and strain thereby applied to the first reinforcement layer 104 may be partly transferred (via the intermediate layer 504) to the second reinforcement layer 502. The stress and strain may be partly transferred in this way because the thicker and softer than conventional intermediate cover 106 may, e.g. deform to allow movement of the second reinforcement layer 502. Accordingly, the stress and strain generated due to the force of the fluid moving through the inner tube 102 at pressure may be more distributed between the layers of the hose 500, and the lifetime of the first reinforcement layer 104 may be increased compared to when conventional intermediate covers are used.

Figure 6:
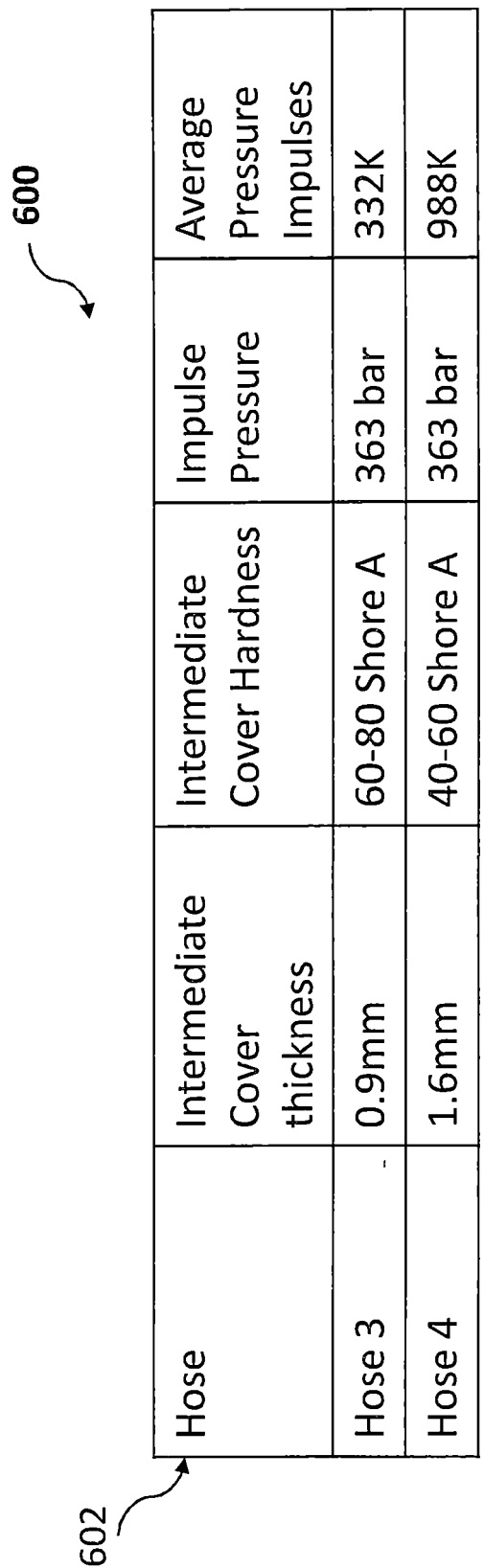
FIG. 6 shows a second table indicated data related to tests performed on a second plurality of hoses.

FIG. 6 shows a second table 600 illustrating results of experiments carried out by the inventors comparing the impulse life of a hose with a conventional intermediate cover and a hose with an intermediate cover having a thickness of between 1.3 mm and 3 mm and comprising a material having a hardness of between 40 Shore A and 60 Shore A. The results were obtained using a testing procedure as described above. Second table 600 shows data for two different hoses, each having a dash size of "−12" and comprising two reinforcement layers similarly to the above-described second hose 500. The first row 602 indicates what information is indicated by the respective columns. Hose 3 comprises a conventional intermediate cover and Hose 4 comprises an intermediate cover having a thickness of 1.6 mm (which is thicker than the conventional intermediate cover) and a hardness of between 40 Shore A and 60 Shore A (making it softer than a conventional intermediate cover).

As can be seen from second table 600, Hose 4 can withstand a much larger number of average pressure impulses than Hose 3. Accordingly, this data demonstrates the extension in the lifetime of Hose 4 by virtue of having a thicker and softer intermediate cover. Similarly to Hose 4 on from which the data shown in Second table 600 was acquired, in some examples, the hose 300 and/or the second hose 500 has a dash size of "−12", the thickness of the intermediate cover 106 is 1.6 mm and the intermediate cover 106 comprises a material having a hardness of between 40 Shore A and 60 Shore A.

It is to be understood that any feature described in relation to any one example may be used alone, or in combination with other features described, and may also be used in combination with one or more features of any other of the examples, or any combination of any other of the examples. It is also understood that the regulator valve 1 as described herein is not limited to an engine application and can be applied to any hydraulic fluid application.

REFERENCE SIGNS LIST 100 first hose
102 inner tube
104 first reinforcement layer
106 intermediate cover
108 outer cover
ID inner diameter
300 graph indicating square wave pressure impulses
302 vertical axis of graph 300
304 horizontal axis of graph 300
306 trace representing fluid pressure with respect to time
400 first table
402 first row of first table 400
500 second hose
502 second reinforcement layer
504 intermediate layer
600 second table
602 first row of second table 600

We claim:
1. A hose comprising:
an inner tube for communicating fluid;
a reinforcement layer positioned over the inner tube;
an intermediate cover positioned over the reinforcement layer, wherein the intermediate cover has a thickness of between 1.3 mm and 3.0 mm and comprises a material having a hardness of between 40 Shore A and 60 Shore A;
an outer cover comprising an abrasion resistant material; and
wherein the intermediate cover comprises rubber.
2. The hose according to claim 1, wherein the intermediate cover has a thickness of between 1.5 mm and 1.7 mm.
3. The hose according to claim 2, wherein the intermediate cover has a thickness of 1.6 mm.
4. The hose according to claim 1, wherein the outer cover comprises ultra-high molecular weight polyethylene (UHMWPE).
5. The hose according to claim 1, wherein an inside diameter of the inner tube is between 6.35 mm and 25.4 mm.
6. The hose according to claim 1, wherein the reinforcement layer comprises metal wire.
7. The hose according to claim 1, wherein the reinforcement layer comprises a spiral reinforcement structure.
8. The hose according to claim 1, wherein the reinforcement layer comprises a braided reinforcement structure.
9. The hose according to claim 1 comprising:
a plurality of reinforcement layers positioned over the inner tube, each neighbouring pair of the plurality of reinforcement layers having sandwiched therebetween an intermediate layer,
wherein, the intermediate cover is positioned over the plurality of reinforcement layers.
10. The hose according to claim 9, wherein the intermediate layers sandwiched between each neighbouring pairs of the plurality of reinforcement layers comprise rubber.
11. A method of manufacturing a hose comprising providing:
an inner tube for communicating fluid;
a reinforcement layer positioned over the inner tube;
an intermediate cover positioned over the reinforcement layer, wherein the intermediate cover has a thickness of between 1.3 mm and 3.0 mm and comprises a material having a hardness of between 40 Shore A and 60 Shore A;
an outer cover comprising an abrasion resistant material; and
wherein the intermediate cover comprises rubber.
12. The method according to claim 11 further comprising providing:
a plurality of reinforcement layers positioned over the inner tube, each neighbouring pair of the plurality of reinforcement layers having sandwiched therebetween an intermediate layer,
wherein, the intermediate cover is positioned over the plurality of reinforcement layers.

* * * * *